Aug. 20, 1957  C. J. WAGNER  2,803,320
WINDOW FRAME CONSTRUCTION
Filed June 1, 1954

INVENTOR.
CARL J. WAGNER
BY
Whittemore, Hulbert & Belknap
ATTORNEYS

United States Patent Office 2,803,320
Patented Aug. 20, 1957

2,803,320

WINDOW FRAME CONSTRUCTION

Carl J. Wagner, Sturgis, Mich.

Application June 1, 1954, Serial No. 433,462

2 Claims. (Cl. 189—75)

The invention relates to window frames more particularly designed for lining window openings in comparatively thin wall structures, such as automobile trailers, but also applicable to other structures.

It is the primary object of the invention to obtain a construction which can be easily installed and secured in an opening in the wall and which will form a weatherproof joint with said wall.

To this end the invention consists in the construction of the window frame and the securing and sealing means therefor.

The invention further consists in the method of installing the frame which insures the forming of a weatherproof sealing joint with the apertured wall and the retention of the frame in said sealing engagement.

The invention further consists in more specific features as hereinafter set forth.

Figure 3:
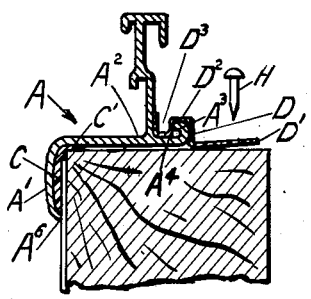
Fig. 3 is a similar view before the tool is engaged.
Figure 1:
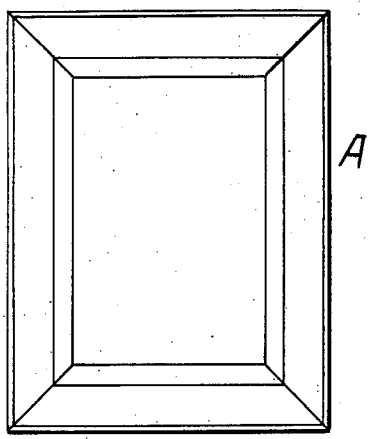
Fig. 1 is a front elevation of the frame.
Figure 2:
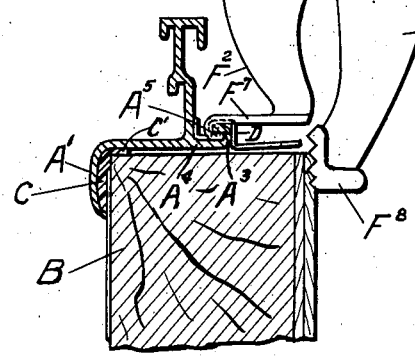
Fig. 2 is an enlarged cross-section illustrating the method and the tool for installing the frame in sealing engagement with the apertured wall.

As illustrated A is the window frame preferably formed of extruded metallic bars which are bevelled at opposite ends and welded or otherwise secured to each other to form the corners of a rectangular structure. The cross-section of these bars includes a portion $A'$ for overlapping the outer face of the building wall adjacent to the window opening, also, a portion $A^2$ generally at right angles to the portion $A'$ for fitting within the opening in the wall and which may also be provided, if so desired, with an inwardly extending portion $A^3$ forming a seat for the window sash. The inner end of the portion $A^2$ is formed with a ledge $A^4$ which, as shown, is a slightly hooked inwardly extending flange spaced from the portion $A^3$ leaving a groove $A^5$ therebetween. The wall B of the enclosure to which the frame is to be applied has an opening therein of a size to receive and fairly closely fit the portion $A^2$. If the closure is an automobile trailer the wall adjacent to the opening may be less than two inches in thickness and the portion $A^2$ of the frame not more than one inch in cross-section length. To form a weatherproof sealing joint a strip C of suitable resilient material, such as "vinyl" plastic, may be placed between the portion $A'$ and the adjacent face of the wall, being preferably held by an inturned portion $A^6$ at the outer edge of the portion $A'$. This strip may also extend slightly into the wall opening, as indicated at $C'$.

For securing the frame A to the wall, I have provided securing members D which are preferably formed of sheet metal and are fashioned for engagement with the ledge $A^4$ at spaced intervals to project inward therefrom and upon all sides of the frame. As specifically shown the members D have a portion $D'$ for projecting inward beyond the frame, a portion $D^2$ for hooking over the ledge $A^4$ and a U-shaped portion $D^3$ for engaging the groove $A^5$ between the ledge and the portion $A^3$. The sheet metal is slightly resilient so that the portion $D^3$ when pressed into the groove $A^5$ will be frictionally held to retain the member D in position. The inwardly extending portion $D'$ is normally at a slight angle such as 5° with respect to the portion $A^2$ to avoid catching when the frame is introduced into the wall opening as will be later explained.

*Method of installing the frame*

To install the frame in the opening in the wall and to insure a sealing joint therewith I proceed as follows:

The frame with all the members D secured thereto and with the sealing strip C adjacent to the inner face of the portion $A'$ is initially inserted within the wall opening. The operator then successively draws inward the portion of the frame adjacent to each of the securing members D, thereby compressing the portion of the strip C in alignment therewith. While still subjected to this inward drawing force the member D is secured to the wall by a nail or other fastening member E which is driven into the face of the wall bounding the opening. This will retain the sealing strip C under compression and after all of the members C have been thus secured a perfect sealing joint between the frame and the wall is obtained. Also, the frame is securely held against displacement.

For applying this inward drawing force to the frame I preferably employ a tool, such as F. This is of the general form of a pair of pliers having a handle portion $F'$, a jaw member $F^2$ fixed thereto, a movable jaw member $F^3$ pivoted at $F^4$ and operated by a movable handle $F^5$ and a toggle link $F^6$ to force the jaws towards each other. The jaw member $F^2$ has attached to its end a hook member $F^7$ for engaging the hook ledge $A^4$. The jaw member $F^3$ extends beyond the member $F^2$ and is provided with a bearing member $F^8$ for engaging the inner face of the wall. With this tool the operator may easily draw inward the portion of the frame adjacent to a fastener D and hold it while the nail or fastener E attaches said securing member to the wall.

From the above it will be understood that the window frames may be very easily and quickly installed in the openings in the wall and secured to the latter with a weatherproof sealing joint.

What I claim as my invention is:

1. A window construction including a frame for engaging an opening in a wall, said frame having portions extending generally at right angles to each other, the one engaging the outer face of the wall surrounding said opening, the other fitting within said opening and being less than the thickness of said wall, a transversely projecting ledge at the inner end of the latter portion, and spaced securing members attached to and projecting inward from said ledge prior to insertion of the frame in said wall opening, adapted after insertion to be successively fastened to said wall.

2. The construction as in claim 1 in which said securing members are formed of sheet metal having hook portions engaging said ledge and the inwardly projecting portions thereof are adjacent to said face of the wall bounding said opening and are nailed thereto to form said fastening means.

References Cited in the file of this patent

UNITED STATES PATENTS

| | | |
|---|---|---|
| 2,270,348 | Rumney | Jan. 20, 1942 |
| 2,672,959 | Young | Mar. 23, 1954 |